UNITED STATES PATENT OFFICE.

HERMANN DAMKÖHLER AND HUGO SCHWINDT, OF BREMEN, GERMANY.

CLARIFYING EXTRACTS CONTAINING TANNIN.

979,656. Specification of Letters Patent. Patented Dec. 27, 1910.

No Drawing. Application filed December 14, 1909. Serial No. 533,055.

*To all whom it may concern:*

Be it known that we, HERMANN DAMKÖHLER and HUGO SCHWINDT, both citizens and residents of the free city of Bremen, in the Empire of Germany, have invented certain new and useful Improvements in Clarifying Extracts Containing Tannin, of which the following is a specification.

Our invention relates to the treatment of extracts containing tannin, and has for its object to obtain clear extracts which will yield a uniform tanning action. Extracts from vegetable matter containing tannin such as are used for tanning leather, frequently contain coloring matters which give an uneven coloring to the leather and thus interfere with its utility or value. Thus extracts made from mangrove bark, which is very rich in tannin, contain reddish-brown coloring matter, which produces the objectionable uneven results above referred to.

In our pending application, Serial No. 502,423, filed June 16, 1909, we have described a process for the removal of the objectionable coloring matter and also an apparatus for carrying out such process. This process consisted in decolorizing extracts containing tannin by electrolysis, adding to the baths in which the electrodes are immersed, salts of the metals of which the electrodes are formed. We stated that in the practical carrying out of our invention, we had found it advantageous to construct each of the electrodes of aluminum and zinc, to separate the anode from the cathode by a partition or cell, and to fill the anode compartment with a mixed solution of aluminum sulfate and zinc sulfate, which mixed solution is also added to the tanning liquid in which the cathode is immersed. The clearing of the infusion and the precipitation of the coloring matters by this electrolytic process is evidently due to the fact that the nascent hydrogen, owing to the avoidance of polarization in the cell, clarifies the coloring matters contained in the tanning liquid by reduction, and on the other hand, to the fact that the nascent hydroxids of the metals used for the electrodes act upon the tanning liquid and thus precipitate the coloring matter as color-lakes. That the chemical processes actually take place in this manner may be seen from the reactions which take place when infusions containing tannin are treated with aluminum amalgam and aluminum carbids.

When aluminum amalgam is decomposed by a solution of tannin in water, hydrogen on the one hand and aluminum hydroxid on the other are set free in a nascent condition. These two nascent substances bring about the clarification of the tanning solution in a manner analogous to that of the electrolytic process. When aluminum carbids are decomposed, nascent aluminum hydroxid is set free while, instead of the hydrogen, acetylene gas is formed, which has a strong reducing action. Both reagents produce the same degree of clarification; therefore, in both the above mentioned reactions, the formation of nascent hydroxid and of reducing agents in gaseous form is a common feature. That, however, the desired clarification may be brought about without the presence of a reducing agent, that is to say, by the action of the nascent hydroxids alone, is shown by the behavior of the aluminates of the alkaline earths, especially of an aluminate of barium, for example, in its most easily procurable form, the meta-combination, $$BaAl_2O_4 + 4H_2O.$$

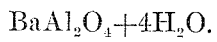

This combination is broken up into the hydroxids of aluminum and of barium by the action of the solution of tannin in water. The affinity of the coloring matters for the two nascent hydroxids appears to be far greater than for the tannins, as a high degree of decolorization of the tanning liquid is attained. Moreover, the aluminate of barium process achieves better results than do the other processes and the cost of operation of the same is much less.

The process is carried on in the following manner: To the tanning liquid which is to be decolorized is added a barium aluminate combination dissolved in water, for instance, meta-aluminate of barium, $$BaAl_2O_4 + 4H_2O$$

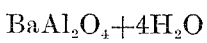

whereby a very voluminous, strongly colored color-lake is produced, which, however, does not readily settle. By the addition of a small amount of diluted sulfuric acid or of a diluted sulfate, which is calculated relatively to the barium content of the added barium aluminate combination, there is formed an insoluble precipitate containing barium which, itself strongly colored, surrounds the alumina color-lake which is present, and, by its specific gravity, causes the same to be quickly deposited. The loss of tannin can be reduced to a minimum by an exact calculation of the added materials according to tests made in advance upon samples of the liquid. For each 100 kg. of calculated dry extract there are employed, according to the coloring matter content of the tanning liquid about 1.2 kg. of aluminum-hydrate calculated from the aluminate of barium added to the liquid. The barium which is contained in this combination is precipitated as barium sulfate by an equivalent amount of surfuric acid or of a sulfate. The color-lakes which are formed by the nascent substances, to wit, aluminum-hydroxid, barium-hydroxid, and barium sulfate are easily separated from the clarified tanning liquor. As the barium sulfate is comparatively much less readily soluble than the other sulfates of the alkali earths, the use of the aluminates of barium are to be preferred for this process. Moreover, the aluminates of barium are much cheaper than are other aluminates, such as for instance, strontium aluminate.

The following is an illustrative specific example of our process: To 100 kg. of calculated dry extract of mangrove (according to the coloring contents thereof) is added a solution containing about 3 kg. of the (approximately) 75% solution of commerce of aluminate of barium, in 2 kg. of water, the tanning liquid being at a temperature of 40° C. The mixture is constantly stirred, and there is added gradually a solution of 1.8 kg. of sulfate of aluminum in 3 kg. of water, which solution has previously been clarified by about .1 kg. of diluted sulfuric acid. The resulting mixture is then heated for about an hour to 95° C. being constantly stirred during such time. The resulting color lake precipitates are separated from the liquid in the well known manner, and the clear liquor concentrated to the desired degree.

When we speak in the claims of a "sulfate" we desire it to be understood that we include by this expression the sulfate of hydrogen, that is to say, sulfuric acid.

We claim:

1. The process of clarifying extracts containing tannin, which consists in adding thereto an aluminate of the alkaline earth metals.

2. The process of clarifying extracts containing tannin, which consists in adding thereto an aluminate of barium.

3. The process of clarifying extracts containing tannin, which consists in adding thereto meta aluminate of barium.

4. The process of clarifying extracts containing tannin, which consists in adding thereto an aluminate of the alkaline earth metals and precipitating the resulting color-lake by means of a water soluble sulfate.

5. The process of clarifying extracts containing tannin, which consists in adding thereto an aluminate of barium and then precipitating the resulting color-lake by means of a water soluble sulfate.

6. The process of clarifying extracts containing tannin which consists in adding thereto metal aluminate of barium and then precipitating the resulting color-lake by means of a water soluble sulfate.

7. The process of clarifying extracts containing tannin, which consists in adding thereto an aluminate of the alkaline earth metals and then precipitating the resulting color-lake by means of dilute sulfuric acid.

8. The process of clarifying extracts containing tannin, which consists in adding thereto meta aluminate of barium and then precipitating the resulting color-lake by means of dilute sulfuric acid.

In testimony whereof we have hereunto set our hands in the presence of two subscribing witnesses this 26th day of November, 1909.

HERMANN DAMKÖHLER.
HUGO SCHWINDT.

Witnesses:
EMIL FORSTER,
FREDERICK HOYERMANN.